(12) United States Patent
Tonti et al.

(10) Patent No.: US 11,999,092 B2
(45) Date of Patent: Jun. 4, 2024

(54) METHOD AND SYSTEM FOR BLOWING A PARISON

(71) Applicant: SIAPI S.R.L., San Vendemiano (IT)

(72) Inventors: Stefano Tonti, Parma (IT); Michele Varaschin, Vittorio Veneto (IT)

(73) Assignee: SIAPI S.R.L., San Vendemiano (IT)

( * ) Notice: Subject to any disclaimer, the term of this patent is extended or adjusted under 35 U.S.C. 154(b) by 0 days.

(21) Appl. No.: 18/166,168

(22) Filed: Feb. 8, 2023

(65) Prior Publication Data

US 2023/0249392 A1 Aug. 10, 2023

(30) Foreign Application Priority Data

Feb. 10, 2022 (IT) .......................... 102022000002438

(51) Int. Cl.
*B29C 49/62* (2006.01)
*B29C 49/42* (2006.01)
*B29L 31/00* (2006.01)

(52) U.S. Cl.
CPC ........ *B29C 49/42832* (2022.05); *B29C 49/62* (2013.01); *B29C 2049/627* (2013.01); *B29L 2031/7158* (2013.01)

(58) Field of Classification Search
CPC .......................... B29C 2049/627; B29C 49/62
See application file for complete search history.

(56) References Cited

U.S. PATENT DOCUMENTS

| 11,345,073 | B2 | 5/2022 | Clüsserath |
| 2016/0001488 | A1 | 1/2016 | Clüsserath |
| 2016/0053777 | A1 | 2/2016 | Winzinger et al. |
| 2016/0257052 | A1* | 9/2016 | Sun ........................ B65D 81/38 |
| 2018/0222106 | A1 | 8/2018 | Okuyama |

FOREIGN PATENT DOCUMENTS

DE 102013101642 A1 8/2014

OTHER PUBLICATIONS

Search Report from IT-2022000002438, Date of Completion: Aug. 29, 2022, 2 pages.
Written Opinion from IT-2022000002438, Date of Deposit: Oct. 10, 2022, 5 pages.

* cited by examiner

*Primary Examiner* — Robert B Davis
(74) *Attorney, Agent, or Firm* — Pearne & Gordon LLP; Bryan M. Gallo

(57) ABSTRACT

A production method for blowing a container starting from a parison comprising the steps of:
i) positioning a parison inside a forming mould (2) for forming the container;
ii) deforming the parison (10) placed in the mould (2); the step of deforming the parison (10) comprising the sub-steps of:
   introducing a pressurised fluid into the parison (10) placed in the mould (2);
   sucking gas which is located inside the mould (2) and outside the parison (10) present in the mould (2).

3 Claims, 4 Drawing Sheets

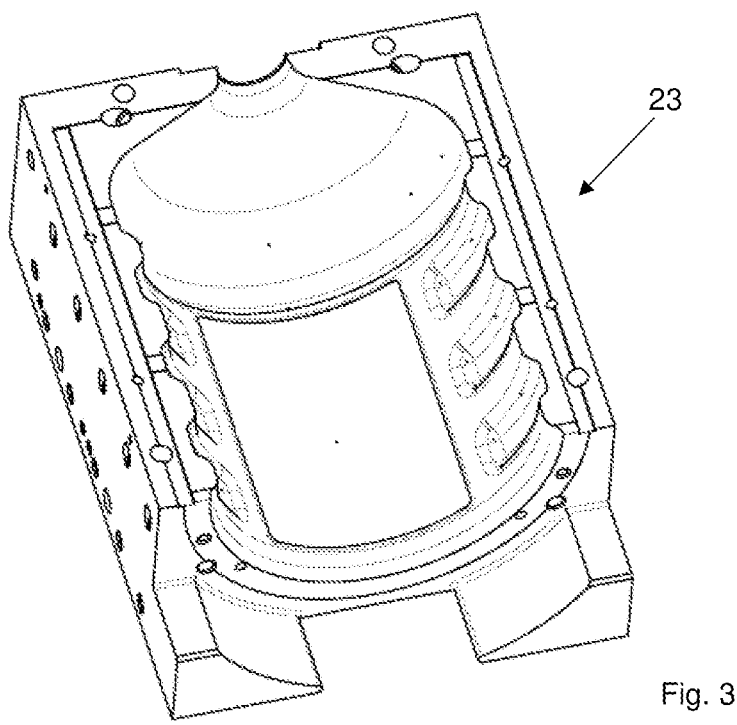
Fig. 3
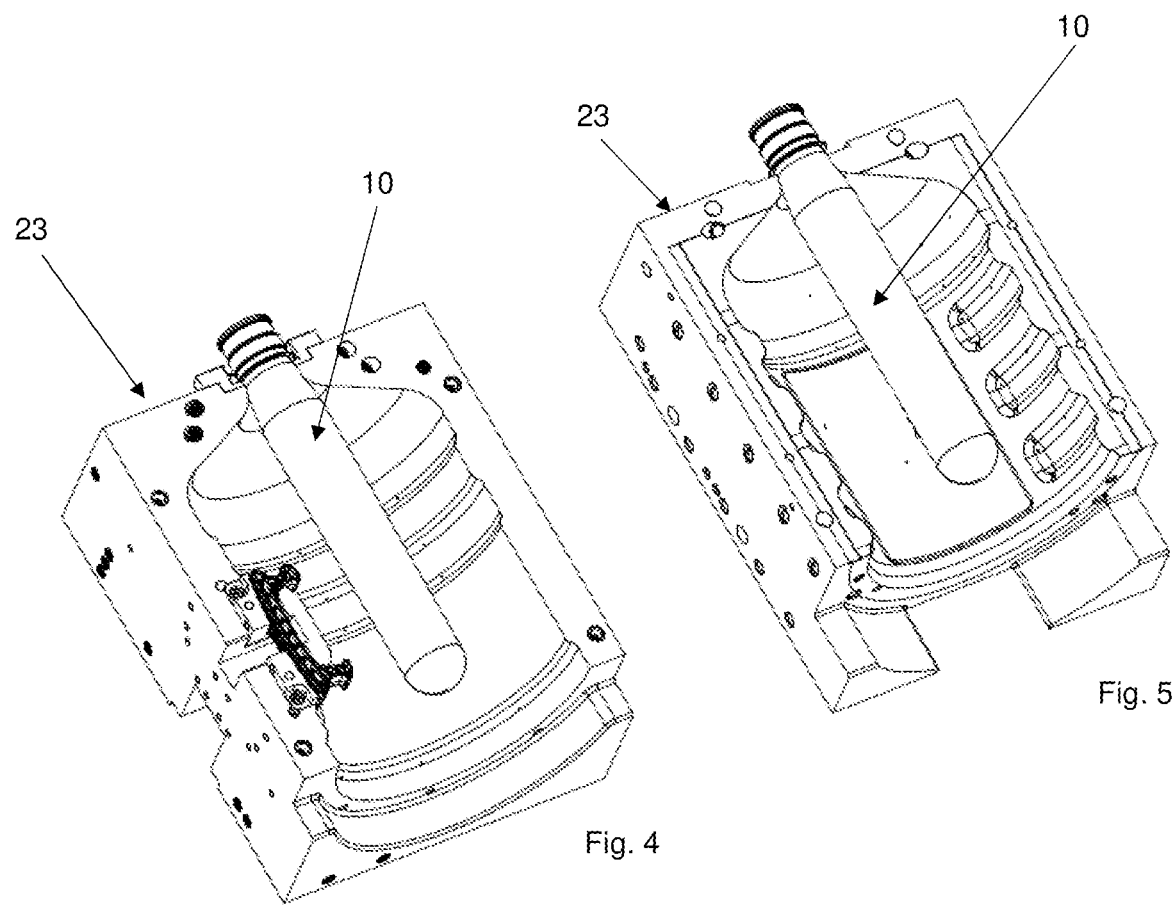
Fig. 4
Fig. 5

METHOD AND SYSTEM FOR BLOWING A PARISON

The present invention relates to a method and system for blowing a parison for obtaining a container.

Blowing systems are known in which a parison, previously heated, is placed in a mould. A pressurised fluid is introduced into the parison which causes the deformation thereof. Possibly the longitudinal deformation of the parison can be facilitated by the presence of a stretching rod introduced inside the parison. The pressurised fluid introduced into the parison allows the parison to expand and fill the mould, thereby assuming the desired shape. There are air evacuation holes in the mould which allow to put the inside and the outside of the mould in communication with each other. The evacuation holes allow the air present in the mould to be expelled following the expansion of the parison.

In this context, the technical task underlying the present invention is to propose a method and a system which allow to facilitate making containers with complex shapes. A further object of the present invention is to reduce the introduction pressure of the blowing fluid and to speed up production. The defined technical task and the specified objects are substantially achieved by a method and a system for blowing comprising the technical features set forth in one or more of the appended claims.

Further features and advantages of the present invention will become more apparent from the indicative and thus non-limiting description of a preferred but not exclusive embodiment of a method and a system for blowing, as illustrated in the appended drawings, in which:

FIGS. 2 and 3 show two alternative solutions of a detail of a mould used in the system according to the present invention;

Figure 2:
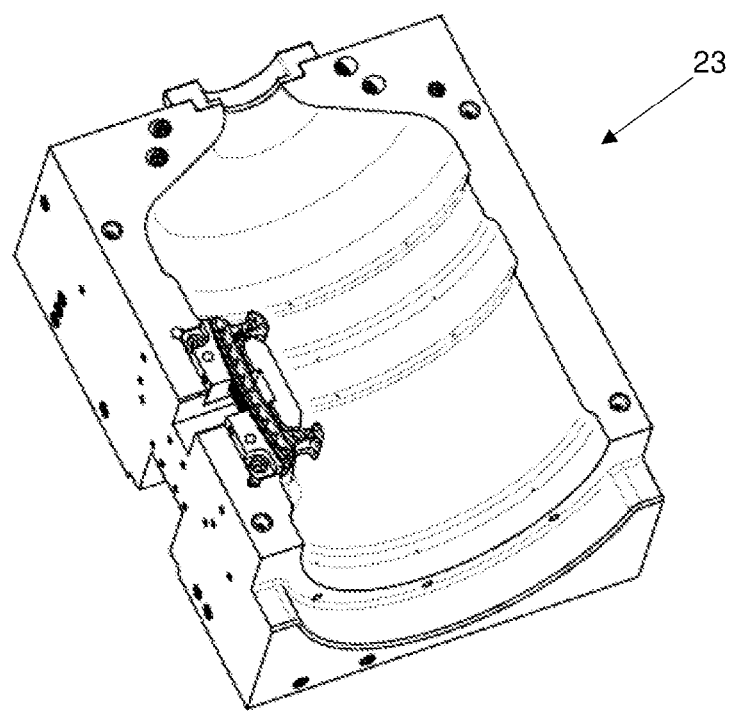
Figure 6:
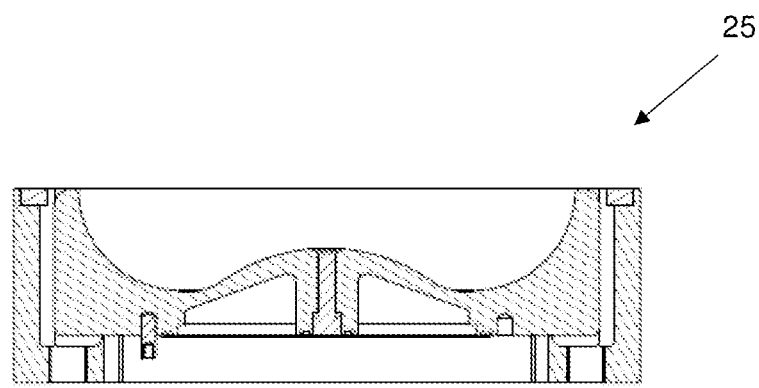
Figure 7:
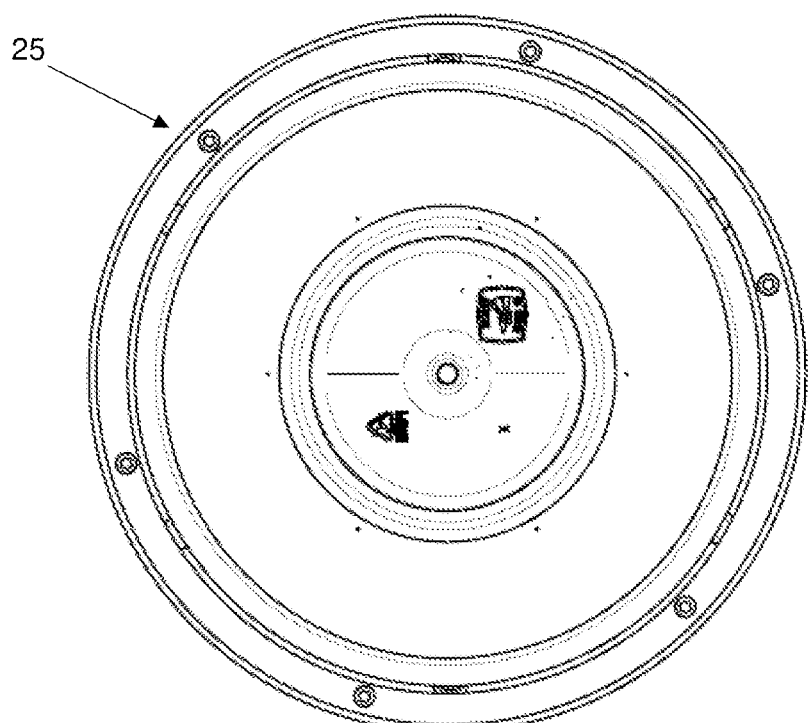
Figure 8:
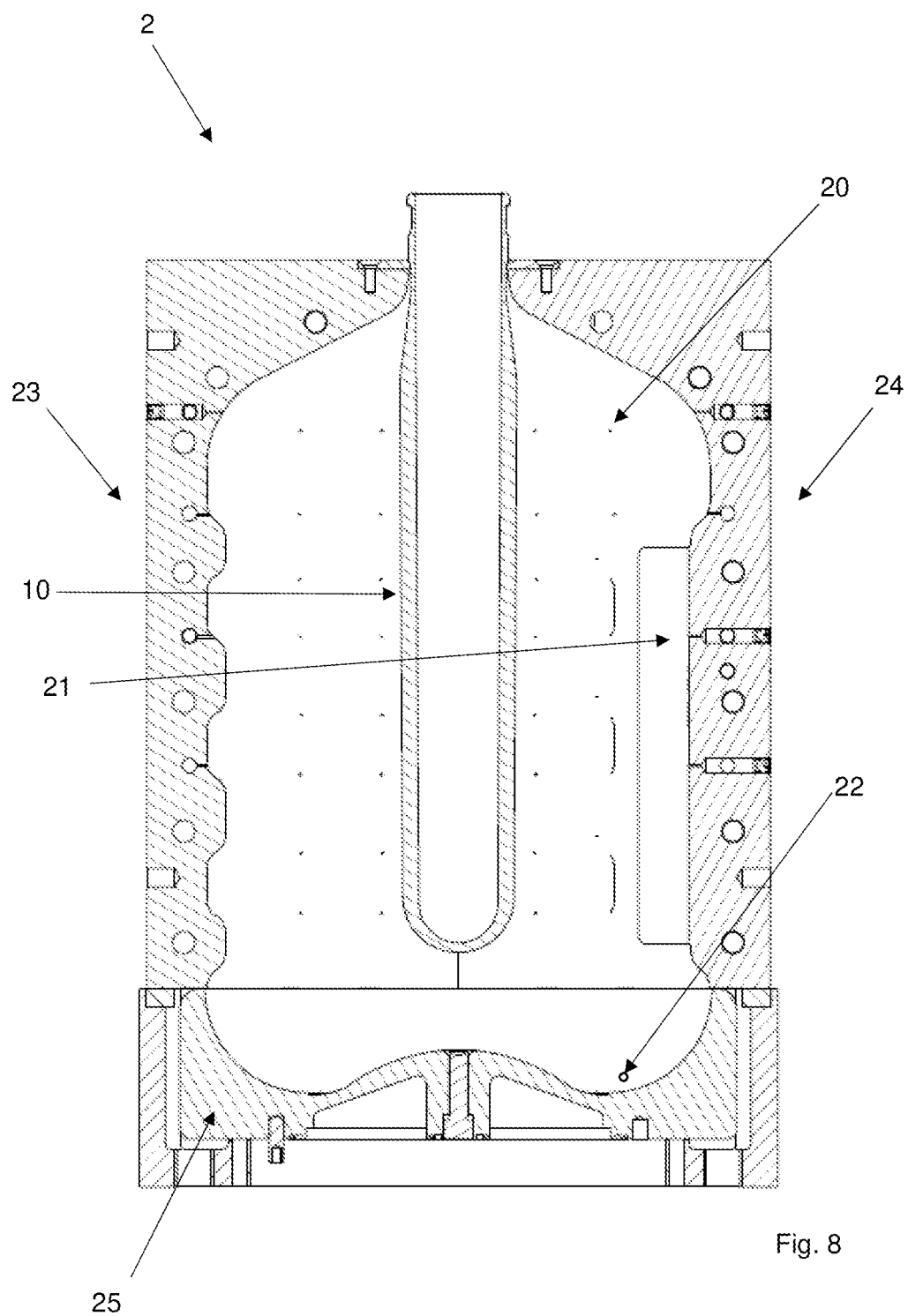

FIGS. 4 and 5 respectively show the details of FIGS. 2 and 3 with a parison inside;

FIGS. 6 and 7 show in sectional and plan view a detail of a mould used in the system according to the present invention;

FIG. 8 shows a sectional view of a mould used in the system according to the present invention.

In the appended figures, reference numeral 1 denotes a blowing system of a parison for making a container. The container is intended for the most diverse applications, for example a container for food use, for the containment of chemical products, for demineralised water, etc. Suitably, the parison and therefore the container which derives therefrom is made of plastic material, in particular thermoplastic, advantageously made of PET. Suitably, the system 1 comprises a mould 2 which delimits a forming space 20 for forming the container. The forming space 20 is the space in which the transformation from parison to container occurs. The forming space 20 is a cavity of the mould 2. The container in output from the mould 2 is suitably counter-shaped to the walls delimiting the forming space 20. The mould 2 suitably comprises several pieces which together define the forming space 20. For example, the mould 2 comprises a first and a second lateral half-shell 23, 24 and a bottom 25. Examples of a first lateral half-shell are shown in FIGS. 2-5. Examples of plates are shown in FIGS. 6-7. The mould 2 is openable to allow the insertion of the parison and the extraction of the container. The opening of the mould 2 suitably presupposes the relative distancing of the first half-shell 23 from the second half-shell 24 and/or from the bottom 25.

The system 1 suitably comprises a means 4 for introducing a pressurised fluid into the parison placed in the mould 2.

Suitably, the introduction means 4 comprises a mouth 25 for introducing pressurised fluid into the parison 10. The introduction mouth 25 is suitably obtained at a portion of the mould 2. In an operating configuration a mouthpiece of the parison 10 is placed at the pressurised fluid introduction mouth 25. Suitably, the introduction means 4 comprises one or more pressurised sources operatively connectable to the introduction mouth 25. If there is more than one pressurised source, they are typically at different pressures from each other. Suitably, one or more solenoid valves are interposed between a corresponding pressurised source and the introduction mouth 25. The presence of several solenoid valves allows to dispense the pressurised fluid at different pressures. Suitably, the opening time of the solenoid valve(s) is controllable. Suitably, there is a system for opening the solenoid valves in succession. Thereby the desired pressure-time profile can be set at the mouth 25.

Preferably the pressure dispensed by the pressurised sources is less than 40 bar.

The system 1 suitably comprises a gas suction means 3 comprising at least a first opening 21 placed along a wall of the mould 2 defining the forming space 20. Typically the first opening 21 is located along a lateral side of the mould 2. Suitably, the suction means 3 sucks air. During the present discussion, the gas suction means 3 can also be defined as a gas suction system.

Suitably, the sucking means 3 comprises a second opening 22 which leads into said forming space 20.

The suction means 3 comprises an aspirator 30. The aspirator 30 is operatively connectable with the first opening 21; preferably the aspirator 30 is operatively connectable with both the first and with the second opening 21, 22.

Therefore, in the preferred solution, the aspirator 30 performs both the suction from the first opening 21 and the suction from the second opening 22.

Suitably the first opening 21 can be part of a first group of openings connected by means of a first conduit to the aspirator 30. The second opening 22 can be part of a second group of openings connected by means of a second conduit to the aspirator 30.

The first opening 21 can lead directly into the forming space 20 or indirectly by means of a groove obtained on a part of the mould 2 and open towards the inside of the space 20. What is described with reference to the first opening 21 can possibly be repeated also for the second opening 22. Suitably the first opening 21 is obtained on the first half-shell 23. Suitably the second opening 22 is obtained on the bottom 25 (in FIG. 8 an opening 22 is indicated only for illustrative purposes and in schematic form). Suitably, between the aspirator 30 and the mould 2, the suction means 3 comprises a tank 31 in which the gas sucked from the mould 2 transits. Advantageously, the system 1 comprises:

a first valve means 51 which enables/prevents fluid communication between the aspirator 30 and the first opening 21;

a second valve means 52, which can be operated separately from the first valve means 51, which enables/prevents fluid communication between the aspirator 30 and the second opening 22.

Figure 1:
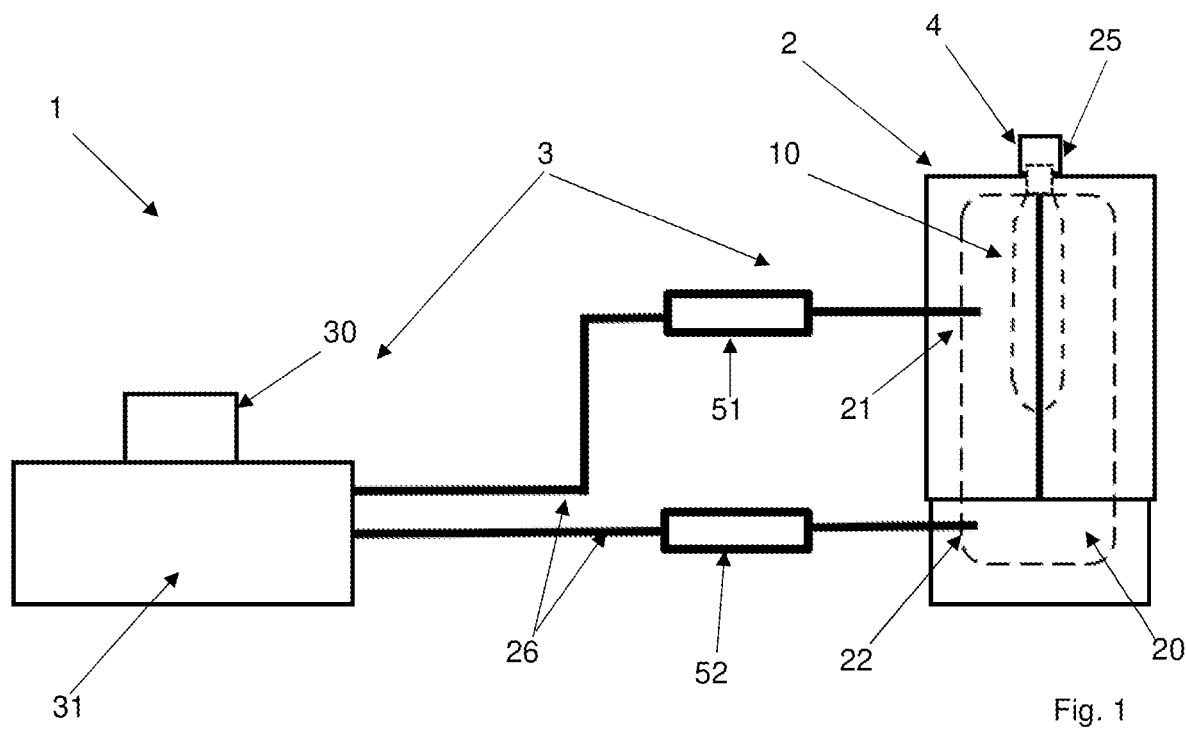
FIG. 1 shows a schematic view of a blowing system according to the present invention.

In the solution schematically shown in FIG. 1, the first and the second valve means 51, 52 are indicated as two distinct valves placed on two distinct conduit sections. They could possibly be integrated in a same valve body, keeping the possibility of opening/closing separate.

By using the first and the second valve means 51, 52, the suction means 3 can be modulated as a function of the area of the mould 2. For example it allows a different suction at the first and at the second opening 21, 22. Such modulation occurs by adjusting the opening and closing times of at least the first and the second valve 51, 52. In such a case, it is possible to speak of a double-draw suction means.

Suitably, the suction means 3 comprises a system 26 of conduits connecting the aspirator 30 and at least the first and the second opening 21, 22. For example, such a system 26 of conduits could comprise a common section which branches off so that a first branch connects to the first opening 21 and a second branch connects to the second opening 22 (solution not illustrated). The system 26 of conduits could however also comprise separate channellings connecting the aspirator 30 respectively with the first and the second opening 21, 22 (as for example schematically shown in FIG. 1).

Suitably, the suction means 3 comprises a plurality of openings which lead into the mould 2. They are connected to the aspirator 30. For example, there is a number of openings which lead into the mould which is greater than 20, advantageously comprised between 25 and 50. Such openings also comprise the first and the second opening 21, 22 indicated above. Suitably, the suction means 3 comprises a conduit:
- extending parallel to an inner wall of the mould 2;
- from which a first group of openings extend which lead into said forming space 20 and comprising the first opening 21;
- connectable to the aspirator 30.

Suitably, but not limitedly, the suction means 3 exerts a depression whose absolute value is less than 0.95 bar. Suitably, but not limitedly, the suction means 3 exerts a depression whose absolute value is greater than 0.5 bar. An object of the present invention is a production method for blowing a container starting from a parison. Such a method is advantageously carried out by means of a system 1 having one or more of the features described above. The method comprises the steps of:
i) positioning a parison inside a forming mould 2 for forming the container;
ii) deforming the parison 10 placed in the mould 2.

The step of deforming the parison 10 comprises the sub-steps of:
- introducing a pressurised fluid into the parison 10 placed in the mould 2 (for example this is performed at a pressure comprised between 20 and 25 bar);
- sucking gas which is located inside the mould 2 and outside the parison 10 present in the mould 2 (for example this occurs with a depression whose absolute value is advantageously comprised between 0.5 and 1 bar).

The step of introducing a pressurised fluid into the parison 10 and the step of sucking gas which is located inside the mould 2 and outside the parison 10 are at least in part simultaneous. Suitably the step of sucking the gas which is located inside the mould 2 and outside the parison 10 starts before the step of introducing a pressurised fluid into the parison 10. The step of sucking the gas can possibly start before the complete closing of the mould. This makes it possible to ensure that the depressurisation action can be started without delays or dead times when the mould is closed.

The step of sucking gas comprises the step of creating a differentiated depression in at least two areas of the mould 2. Thereby, a more intense suction can be carried out in the areas where such an action is necessary to be able to correctly shape the parison. In particular, in the vicinity of areas with bends, cusps and pronounced edges, the depression allows a better adhesion, of the parison being deformed, to the wall of the mould 2. Advantageously the step of sucking gas comprises the step of evacuating the gas from the mould 2 through at least a first and a second opening 21, 22. There could be many more openings. Suitably the openings are distributed along the walls of the mould 2.

The step of sucking the gas occurs by means of an aspirator 30 connectable to at least the first opening 21 and the second opening 22. Suitably, the aspirator 30 is common to the first and to the second opening 21, 22. It therefore exerts its action on both the first and on the second opening 21, 22.

The step of sucking the gas comprises the sub-steps of:
- sucking the gas through at least the first opening 21 for a first time duration; for example this occurs by opening or closing a first valve means 51 interposed between the first opening 21 and the aspirator 30;
- sucking the gas through at least the second opening 22 for a second time duration; for example this occurs by opening or closing a second valve means 52 interposed between the second opening 22 and the aspirator 30. The second time duration is different from the first time duration. It is thereby possible to diversify the suction action in different areas of the mould 2. Typically the intensity of the depression is the same, but in different areas of the mould 2 the duration varies as a function of needs.

In fact, the step of sucking the gas envisages making the walls of the parison 10 adhere to corresponding walls of the mould 2.

The present invention achieves important advantages.

First, it allows to shape containers with complex shapes. In fact, the suction activity on the walls of the mould allows a better adhesion of the expanding parison. Furthermore, the suction activity in combination with the pressurisation inside the parison allows to speed up the forming operation and therefore productivity. Another important advantage is linked to the fact that the suction activity allows to limit the pressurisation inside the parison and this translates into economic savings.

The invention as it is conceived is susceptible to numerous modifications and variants, all falling within the scope of the inventive concept characterised thereby. Further, all the details can be replaced with other technically equivalent elements. In practice, all the materials used, as well as the dimensions, can be any whatsoever, according to need.

The invention claimed is:

1. A system for blowing a parison for making a container comprising:
   - a mould (2) which delimits a space (20) for forming the container starting from the parison;
   - a means (4) for introducing a pressurised fluid into the parison placed in the mould (2);
   - a gas suction means (3) comprising:
     i) at least a first opening (21) placed along a wall of the mould (2);
     ii) a second opening (22) which leads into said forming space (20); and
     iii) an aspirator (30) operatively connectable with both the first and with the second opening (21, 22);
   - a first valve means (51) which enables/prevents fluid communication between the aspirator (30) and the first opening (21); and a second valve means (52), which can be operated separately from the first valve means (51), which enables/prevents fluid communication between the aspirator (30) and the second opening (22);

wherein the first and second valve means (51, 52) are two distinct valves placed on two distinct conduit sections; and wherein the first opening (21) leads into the forming space (20) indirectly by means of a groove located on a part of the mould (2) and opens towards an inside of the forming space (20).

2. The system according to claim 1, characterised in that the mould (2) comprises a first and a second lateral half-shell (23, 24) and a bottom (25) which in combination identify the forming space (20); the first opening (21) being formed on the first half-shell (23), the second opening (22) being formed on the bottom (25).

3. The system according to claim 1, characterised in that it comprises a conduit section:

which extends inside the mould following a wall which delimits the forming (2) space (20);

from which a plurality of openings extend which lead into said forming space (20) and comprising the first opening (21);

connectable to the aspirator (30).

* * * * *